March 27, 1928.

A. H. CANDEE 1,664,242

GAS ELECTRIC POWER SYSTEM

Filed Feb. 19, 1927

WITNESSES:
E. A. M?Closkey
E. W. Savage

INVENTOR
Andrew H. Candee.
BY
Wesley G. Carr
ATTORNEY

Patented Mar. 27, 1928.

1,664,242

UNITED STATES PATENT OFFICE.

ANDREW H. CANDEE, OF WILKINSBURG, PENNSYLVANIA, ASSIGNOR TO WESTINGHOUSE ELECTRIC & MANUFACTURING COMPANY, A CORPORATION OF PENNSYLVANIA.

GAS-ELECTRIC POWER SYSTEM.

Application filed February 19, 1927. Serial No. 169,523.

This invention relates generally to gas-electric power systems, and more particularly to the means for driving the air compressors or other auxiliary devices provided in such power systems.

The object of the invention, generally stated, is the provision of a compressor drive for gas-electric power systems, that shall be simple and efficient in operation, and readily and economically manufactured.

A more specific object of the invention is to provide for the operation of an air compressor, or any other auxiliary device, at the desired speed to effect its efficient functioning at different engine speeds, thereby to assure the air supply required for braking purposes.

Another object of the invention is to provide for the selective connection to the generator of motor windings that are designed for operation at different voltages when the generated voltage varies because of changes in the engine speed.

Other objects of the invention will, in part, be obvious and, in part, will appear hereinafter.

The invention accordingly is disclosed in the embodiment thereof shown in the accompanying drawing, and comprises the features of construction, combination of elements, and arrangement of parts which will be exemplified in the construction hereinafter set forth, and the scope of the application of which will be indicated in the claims.

Figure 1:
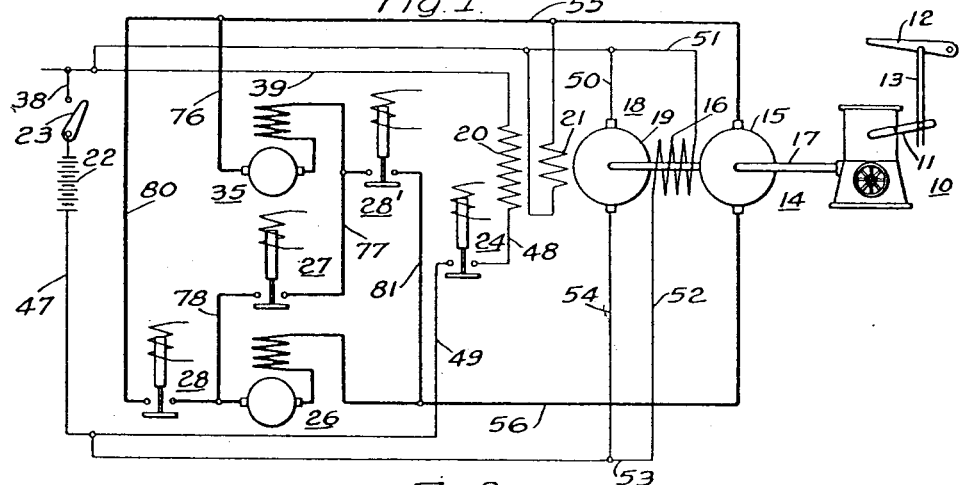
Figure 2:
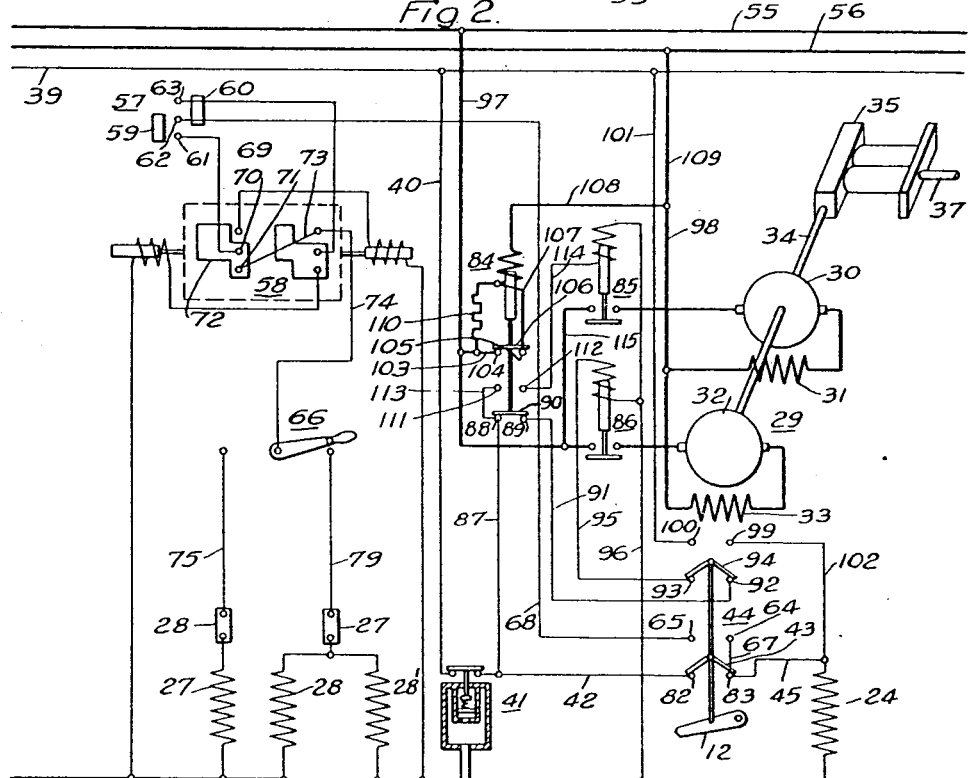

For a general understanding of the nature and objects of the invention, reference should be had to the following detailed description, taken in conjunction with the accompanying drawing, in which;

Fig. 1 is a diagram of the main-circuit connections of a gas-electric power system arranged in accordance with this invention; and Fig. 2 is a diagram of control circuits connected in accordance with this invention for governing the operation of the different units of the power system.

Referring now to the drawing, an internal combustion engine 10 of any suitable type may be used as the prime mover of a gas-electric power system for propelling railway vehicles or the like. As is usual practice, the speed of internal combustion engines is controlled by regulating the fuel supply and, in this particular embodiment of the invention, a throttle 11 is provided for controlling the fuel supply to the engine 10. In order to facilitate the operation of the throttle 11, an actuating lever 12 is disposed in a position accessible to the operator and connected to the throttle 11 by means of a rod 13.

As will be observed, a generator 14, provided with an armature 15 and a shunt field winding 16, is directly connected to the engine 10 through a shaft 17. In this particular embodiment of the invention, the generator 14 that is utilized is of the shunt type.

In order to provide for the energization of the generator 14, an exciter 18 having an armature 19, a shunt field winding 20, and a differential field winding 21, is disposed with the armature 19 connected across the generator field winding 16. As will be noted, the shunt field winding 20 of the exciter is connected across a storage battery 22, while the differential winding 21 is connected in series relation with the armature 15 of the generator 14. Control of the circuit for energizing the shunt field winding may be effected by means of either a manually operable switch 23, or an electro-magnetic switch 24, the operation of which will be referred to hereinafter.

The generator 14 may be utilized for supplying power to the propelling motors 25 and 26 of the power system. It will be noted that the motors 25 and 26 are of the series type and disposed to be connected in series or parallel relation by means of electro-magnetic switches 27, 28 and 28'. While the use of a plurality of propelling motors and means for connecting them for operation in series and parallel relation is not essential to the operation of the invention to be described hereinafter, they are illustrated and described because it is with such propelling units that the invention will be generally used.

When the gas-electric power system is utilized for propelling railway vehicles, some means is ordinarily provided for operating an air compressor to provide the supply of compressed air required for the operation of the brakes. In gas-electric power systems of this kind, the most convenient method of actuating an air compressor is to utilize an electric motor that may be energized from the main generator.

As will be readily understood, when a gas-electric power system is utilized in railway work, the supply of compressed air may become excessively diminished because of braking operations, or for other reasons, either when the gas-electric engine is operating at rated speed and moving the vehicle, or at idling speed while the vehicle is at rest. In many instances the failure of the air supply is caused by the difference between the idling speed and the rated speed of the internal combustion engine, which difference is great enough to cause a drop in the voltage developed by the generator that is sufficient to interfere with the efficient operation of the compressor.

In heavy types of gasoline engines that might be used for such purposes as operating a train, the idling speed of the engine is sometimes as low as 250 R. P. M., while the rated speed may be approximately 1100 R. P. M. The voltage developed by the generator under constant load conditions will vary directly as the speed of the engine. Therefore, at idling speed the voltage would not be sufficient to efficiently operate a compressor motor designed to operate on the normal voltage of the generator.

In order to provide for the efficient operation of the compressor from the internal combustion engine of a gas-electric power system, the present invention was introduced. In this embodiment of the invention, a motor shown generally at 29 is provided with two sets of windings, one adapted for operation at high voltage or at the voltage developed by the generator 15 when the internal combustion engine 10 is running at its rated speed and load, and the other a set of low-voltage windings adapted to operate efficiently at the voltage developed by the generator when the engine 10 is idling. The set of high-voltage windings includes an armature 30 and a series field winding 31, while the set of low-voltage windings comprises an armature 32 and series field winding 33. As will be observed, the armatures 30 and 32 are mounted on a common shaft 34, which is disposed to drive an air compressor 35.

While, in this embodiment of the invention, a single motor provided with high-voltage and low-voltage windings is utilized for operating the air compressor, it will be readily understood that two separate motors might be substituted. However, it is pointed out that the use of the separate motors is more expensive and requires a greater amount of floor space, which in trains driven by gas-electric power systems is an important item.

When a railway vehicle of any kind is provided with airbrakes, they cannot be efficiently operated directly from the compressor. Consequently, in this construction, an air storage reservoir 36 connected to the compressor 35 by a pipe 37 is provided.

The control system provided for governing the operation of the main vehicle-propelling motors 25 and 26, and the compressor motor 39 will now be described. Since the motors 25 and 26 are merely incidental to my present system, their operation will not be set forth in great detail.

Assume now that the internal combustion engine 10 has been set in operation and that it is turning over at idling speed. In order to excite the generator field winding 16, the switch 23 is first closed, energizing the actuating coil of the switch 24. As will be observed, when the switch 23 is closed, current flows from the battery 22 through conductors 38, 39 and 40, the governor switch 41, conductor 42, contact plate 43 of a double toggle switch 44, conductor 45, actuating coil of switch 24, and conductors 46 and 47 back to the battery. The closure of the switch 24 establishes a circuit for the exciter field winding 20, and current flows from battery 22 through conductors 38 and 39, exciter field winding 20, conductor 48, switch 24 and conductors 49 and 47 back to the battery.

The exciter 18 now develops a voltage, and current flows from the exciter armature 19 through conductors 50 and 51, the generator shunt field winding 16 and conductors 52, 53 and 54 back to the armature of the exciter. When the generator field winding is thus excited, a voltage is built up in the armature 15, and impressed across the line wires 55 and 56. Since the internal combustion engine 10 is operating only at idling speed, the generator will not build up normal rated voltage.

In order to provide for the charging of the storage battery 22, it is connected across the armature 19 of the exciter. Consequently, when the exciter is operated at rated speed, it will function to charge the battery 22. It will be readily understood that the customary charging regulators may be interposed between the exciter and the battery.

When the engine 10 is accelerated by the actuation of the throttle 11, the generator 14 will build up the voltage required for the operation of the motors 25 and 26, this voltage being controlled to some extent by the current flowing in the differential field winding 21. In order to provide for the proper connections between generator 14 and motors 25 and 26, to effect rotation of the latter in the desired direction, a master reverser switch 57, which controls the setting of the reverser drum 58, is utilized. Since switching devices suitable for mounting on the reverser drum 58 and adapted for reversing motor connections are well known it is considered unnecessary to illustrate them.

The master reverser switch 57 comprises two contact segments 59 and 60, the former being disposed to engage contact fingers 61 and 62, while the latter is positioned to engage contact fingers 62 and 63.

Assume now that it is desired to rotate the motors 25 and 26 in a forward direction, that the master reverser switch 57 is actuated to project the contact segment 59 into engagement with the contact fingers 61 and 62 and that the toggle switch 44, which is disposed for actuation in conjunction with the throttle 11, has been operated to place the contact plate 43 in engagement with the contact fingers 64 and 65. It may also be assumed that the manually operable switch 66 has been actuated to provide for the series connection of the motors 25 and 26.

A circuit is now established which may be traced in Fig. 2 as extending from the energized conductor 39 through conductor 101, contact fingers 100 and 99, bridged by contact plate 94, conductors 102, 45 and 67, contact fingers 64 and 65, bridged by contact plate 43, conductor 68, contact fingers 62 and 61, bridged by contact plate 59, conductor 69, contact fingers 70 and 71, bridged by contact segment 72 of drum 58, conductors 73 and 74, switch 66, conductor 75, interlock 28-out provided on switch 28, and the actuating coil of the switch 27. Upon the closure of the switch 27, the motors are connected in series relation and the motor circuit extends from the energized line conductor 55 through conductor 76, motor 25, conductor 77, switch 27, conductor 78 and motor 26, to the line conductor 56.

In order to operate the motors in parallel relation, the switch 66 is thrown to the right as illustrated in Fig. 2, and current flows from energized conductor 74 through switch 66, conductor 79, interlock 27-out and the parallel-connected actuating coils 28 and 28′ to the negative conductor 46.

In this manner two parallel motor circuits are established: one may be traced from line conductor 55 through conductor 80, switch 28 and motor 26 to line conductor 56, and the other through conductor 76, motor 25, switch 28′ and conductor 81 to line conductor 56.

In order to explain the operation of the compressor motor 29, as the engine 10 is started and accelerated to rated speed, let us again assume that the engine is operating at its idling speed. As will be readily understood, when it is desired to reduce the engine 10 to idling speed, the throttle 11 is actuated to decrease the supply of fuel. Since the toggle switch 44 is connected to the throttle 11, the operation of the latter to decrease the fuel supply serves to project the contact plate 43 into engagement with contact fingers 82 and 83.

The actuation of the toggle switch 44 establishes a new coil-energizing circuit for the switch 24, thus maintaining an energizing circuit for the exciter 18 and accordingly the generator 14. The switch-actuating circuit now established extends from energized conductor 39 through conductor 40, governor switch 41, conductor 42, contact fingers 82 and 83, bridged by contact plate 43, conductor 45 and the actuating coil of switch 24 to the negative conductor 46.

Therefore, as long as the switch 24 remains closed, a voltage is developed by the generator 14, and the line conductors 55 and 56 have a voltage impressed across them. However, since the engine is idling, the voltage impressed across the line conductors 55 and 56 is now insufficient to actuate a voltage relay 84, which is disposed to control the actuating circuits of switches 85 and 86 provided for connecting the high-voltage and low-voltage windings, respectively, of the motor 29 across line conductors 55 and 56.

Assume that the pressure in the reservoir 36 is low and that the governor switch 41 is closed. Current may now flow from energized conductor 40, through governor switch 41, conductor 87, contact fingers 88 and 89, bridged by a contact member 90 carried by the relay 84, conductor 91, contact fingers 92 and 93, bridged by contact plate 94 of the toggle switch 44, conductor 95, actuating coil of switch 86 and conductor 96 to the negative conductor 46, whereby the switch 86 is closed.

In this manner the circuit for the set of low-voltage windings of the motor 29 is established and current flows from energized line conductor 55 through conductor 97, switch 86, the armature 32 and the series field winding 33 of the motor 29 and conductor 98 to line conductor 56. The low-voltage armature 32 now operates the compressor 35 and will continue to do so until the pressure in the reservoir 36 becomes great enough to operate the governor switch 41.

Upon the operation of the governor switch 41, the actuating circuit of the switch 86 is interrupted and the switch is permitted to open, thereby interrupting the circuit of the low-voltage armature windings. However, it will be readily understood that if the engine continues to operate at idling speed, a drop in air pressure, causing the closure of the governor switch 41, will effect a re-establishment of the actuating circuit of the switch 86 and thereby a re-connection of the low-voltage windings across the line conductors 55 and 56 to again operate the compressor 35.

Assume now that it is desired to operate the engine at rated speed, and that the throttle 11 is actuated to increase the fuel supply. As will be readily understood, the operation of the throttle effects upward movement of toggle switch 44, thereby moving contact plate 43 into engagement with contact fingers 64 and 65 and contact plate 94 into engagement with contact fingers 99 and 100.

The actuation of the toggle switch 44 to its upper position establishes an actuating circuit for the switch 24 which extends from positively energized conductor 39 through conductor 101, contact fingers 100 and 99, bridged by contact plate 94, conductor 102 and actuating coil of switch 24 to negative conductor 46. Therefore, while the actuation of the toggle switch 44 effected through the acceleration of the engine 10, interrupts one actuating circuit of the switch 24, it establishes another, and thereby the energization of the field windings of the generator 14 is continued.

Since the engine 10 is now operating at rated speed, the generator 14 builds up a voltage greatly in excess of that generated when the engine was operating at idling speed and the increased voltage is sufficient to actuate the relay 84. As will be observed by reference to Fig. 2, the relay 84 is connected across the line conductors 55 and 56, and current now flows from line conductor 55 through conductors 97 and 103, contact fingers 104 and 105, bridged by contact member 106, conductor 107, actuating coil of relay 84, and conductors 108 and 109 to the negative line conductor 56. Upon the actuation of relay 84, current will flow from energized conductor 97 through a resistor 110, the actuating coil of the relay 84 and conductors 108 and 109 to line conductor 56. In this manner the relay is retained in its raised position and a resistor is inserted in the actuating circuit to prevent an excessive flow of current which might be injurious to the relay coil.

It will be noted that when the relay is actuated, contact member 90 is moved into engagement with contact fingers 111 and 112 and an actuating circuit for the switch 85 is established, which extends from energized conductor 87 through conductor 113, contact fingers 111 and 112, bridged by contact member 90, conductor 114, actuating coil of switch 85 and conductor 96 to negative conductor 46.

When switch 85 is closed, a circuit is established from positive line conductor 55 through conductors 97 and 115, switch 85, conductor 116, the high-voltage armature 30 and field winding 31, and conductors 98 and 109 to negative line conductor 56. It will be understood that the actuation of the governor switch 41 will serve to make and break the actuating circuit of the switch 85, thereby making and breaking the operating circuit of the high-voltage windings of the motor 29.

If, for any reason, the throttle 11 is actuated to decelerate the engine 10, the voltage across the generator 14 immediately decreases, and the voltage relay 85 permits the contact member 90 to drop. In this manner, provision is made for disconnecting the high-voltage windings of the motor 29 from the generator upon a decrease in the generated voltage. If the governor switch is closed, the low-voltage windings will be immediately connected across the generator in a manner hereinbefore described.

From the foregoing description it will be evident that a simple system has been devised for changing the connections of the high-voltage and low-voltage windings in accordance with the speed of the engine 10.

Since certain changes may be made in the above construction and different embodiments of the invention may be made without departing from the scope thereof, it is intended that all matter contained in the above description or shown in the accompanying drawing, shall be interpreted as illustrative and not in a limiting sense.

I claim as my invention:

1. In a gas-electric power system, in combination, an internal combustion engine, a generator driven by said engine whereby the generated voltage varies with the engine speed, a compressor motor disposed to be connected to the generator and provided with high-voltage and low-voltage windings, and means controlled by the generated voltage for selectively connecting the motor windings to the generator.

2. In a gas-electric power system, in combination, an internal combustion engine, a generator driven by said engine whereby the generated voltage varies with the engine speed, a compressor motor disposed to be connected to the generator and provided with high-voltage and low-voltage windings, and a voltage relay connected across the generator and disposed to selectively connect the motor windings to the generator.

3. In a gas-electric power system, in combination, an internal combustion engine, a fuel-control throttle for regulating the fuel supply to vary the speed of the engine, a generator driven by said engine whereby the generated voltage varies with the engine speed, a compressor motor provided with high-voltage and low-voltage windings disposed to be connected to the generator, and means dependent upon the generated voltage for selectively connecting the motor windings to the generator.

4. In a gas-electric power system, in combination, an internal combustion engine, a fuel-control throttle for regulating the fuel supply to vary the speed of the engine, a generator driven by said engine whereby the generated voltage varies with the engine speed, a compressor motor provided with high-voltage and low-voltage windings disposed to be connected to the generator, means dependent upon the generated voltage for selectively connecting the motor windings to the generator, and means adapted to be actuated by the throttle for governing the circuit of the high-voltage motor windings.

5. In a gas-electric power system, in combination, an internal combustion engine, a fuel-control throttle for regulating the fuel supply to vary the speed of the engine, a generator driven by said engine whereby the generated voltage varies with the engine speed, a compressor motor provided with high-voltage and low-voltage windings disposed to be connected to the generator, switches for connecting the compressor motor windings across the generator, actuating circuits for the switches, and a voltage relay connected across the generator for controlling the switch-actuating circuits to selectively connect the motor windings to the generator.

6. In a gas-electric system, in combination, an internal combustion engine, a generator driven by said engine whereby the generated voltage varies with the speed of the engine, high-voltage and low-voltage motor windings disposed to be connected to the generator, an air compressor driven by the motor windings, means dependent upon the generated voltage for connecting the high-voltage and low-voltage motor windings to the generator, and means operable by the developed air pressure for governing the motor circuits.

7. In a gas-electric power system, in combination, an internal combustion engine, a generator driven by the internal combustion engine whereby the generated voltage will vary with the engine speed, a compressor motor provided with high-voltage and low-voltage windings disposed to be connected across the generator, an air compressor disposed for operation by the motor windings, means dependent upon the generated voltage for selectively connecting the motor windings to the generator, and means subject to the air pressure developed by the air compressor for governing the connections of the motor windings across the generator independently of said selective means for connecting the motor windings to the generator.

8. In a gas-electric power system, in combination, an internal combustion engine, a fuel-control throttle for regulating the fuel supply to the engine to vary its speed, a generator driven by the engine whereby the generated voltage will depend upon the speed of the engine, a motor provided with high-voltage and low-voltage windings disposed to be connected across the generator, a compressor driven by the motor, means dependent upon the generated voltage for selectively connecting the motor windings across the generator, and means adapted to be actuated by the fuel-control throttle for governing the connections of the high-voltage motor windings thereby to effect a disconnection of the high-voltage motor windings from the generator when said fuel control throttle is actuated.

9. In a power system, in combination, a prime mover adapted for operation at different speeds, a generator actuated by the prime mover whereby different voltages are generated when the prime mover is operated at different speeds, an auxiliary device which functions efficiently at substantially rated speed, a plurality of driving units for the auxiliary device, said units being adapted for operation at different voltages, and means for selectively connecting said driving units to the generator when the generated voltage varies a predetermined amount.

10. In a power system, in combination, a prime mover adapted for operation at different speeds, a generator provided with a differential field winding and disposed to be driven by the prime mover, the voltage of the generator varying with the engine load and speed, an auxiliary device which functions efficiently at a substantially rated speed, means adapted for operation at voltages below a predetermined value for actuating the auxiliary device, means adapted for operation at voltages above a predetermined value for actuating the auxiliary device, and means sensitive to the generator voltage for selectively connecting an operating means for the auxiliary device to the generator.

11. In a power system, in combination, a prime mover adapted for operation at different speeds, a generator provided with a differential field winding and disposed to be driven by the prime mover, the voltage of the generator varying with the engine load and speed, an auxiliary device which functions efficiently at a substantially rated speed, means adapted for operation at voltages below a predetermined value for actuating the auxiliary device, means adapted for operation at voltages above a predetermined value for actuating the auxiliary device, means sensitive to the generator voltage for selectively connecting an operating means for the auxiliary device to the generator, and means controlled by the voltage of the generator for selecting the actuating means for the auxiliary device.

12. In a power system, in combination, a driven generator which develops a variable voltage, an auxiliary device which functions efficiently at substantially rated speed, a plurality of driving units for the auxiliary device, said units being adapted for operation at different voltages, and means for selectively connecting said driving units to the generator when the generated voltage varies a predetermined amount.

In testimony whereof, I have hereunto subscribed my name this 11th day of February, 1927.

ANDREW H. CANDEE.